US012641543B2

(12) United States Patent
Chen et al.

(10) Patent No.: US 12,641,543 B2
(45) Date of Patent: May 26, 2026

(54) POWER SAVING METHOD AND APPARATUS, DEVICE, AND READABLE STORAGE MEDIUM

(71) Applicant: VIVO MOBILE COMMUNICATION CO., LTD., Dongguan (CN)

(72) Inventors: Li Chen, Dongguan (CN); Xiaodong Shen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 305 days.

(21) Appl. No.: 18/232,823

(22) Filed: Aug. 11, 2023

(65) Prior Publication Data

US 2023/0388930 A1     Nov. 30, 2023

Related U.S. Application Data

(63) Continuation of application No. PCT/CN2022/076684, filed on Feb. 17, 2022.

(30) Foreign Application Priority Data

Feb. 22, 2021     (CN) .......................... 202110199051.1

(51) Int. Cl.
*H04W 52/02*          (2009.01)
(52) U.S. Cl.
CPC ............................... *H04W 52/0251* (2013.01)
(58) Field of Classification Search
CPC ............. H04W 52/02; H04W 52/0229; H04W 52/0235; H04W 52/0251; Y02D 30/70

USPC ........................................................ 370/329
See application file for complete search history.

(56)     References Cited

U.S. PATENT DOCUMENTS

| | | | |
|---|---|---|---|
| 12,082,108 B2 * | 9/2024 | Yang ................. | H04W 52/0235 |
| 2007/0295259 A1 * | 12/2007 | Heidari-Bateni ........................... | |
| | | | H04W 52/0219 |
| | | | 114/293 |
| 2016/0014697 A1 | 1/2016 | Mujtaba et al. | |
| 2017/0045928 A1 * | 2/2017 | Ishikawa ............... | G06F 1/3218 |
| 2018/0024615 A1 * | 1/2018 | Cui ........................ | G06F 1/3206 |
| | | | 713/2 |

(Continued)

FOREIGN PATENT DOCUMENTS

| | | |
|---|---|---|
| CN | 108235412 A | 6/2018 |
| CN | 108924913 A | 11/2018 |

(Continued)

OTHER PUBLICATIONS

International Search Report issued in corresponding International Application No. PCT/CN2022/076684, mailed May 9, 2022, 4 pages.

(Continued)

*Primary Examiner* — Robert J Lopata
(74) *Attorney, Agent, or Firm* — IPX PLLC

(57)          ABSTRACT
This application discloses a power saving method and apparatus, a device, and a readable storage medium. The method includes: performing a first behavior when a terminal is in a first state, where the first behavior is different from a behavior of the terminal in a connected state, an idle state, or an inactive state; and the first state includes one of the following: a sleep state, a zero power state, a near-zero power state, a low power state, or an ultra-low power state.

20 Claims, 2 Drawing Sheets

(56) References Cited

U.S. PATENT DOCUMENTS

| | | | |
|---|---|---|---|
| 2019/0028968 A1 | 1/2019 | Ma et al. | |
| 2019/0349858 A1* | 11/2019 | Jantzi | H04W 76/28 |
| 2020/0314747 A1* | 10/2020 | Zhou | H04L 5/0044 |
| 2021/0014791 A1* | 1/2021 | Freda | H04W 52/0277 |
| 2021/0026437 A1* | 1/2021 | Lingutla | G06F 1/3215 |
| 2021/0208667 A1* | 7/2021 | Newby | G06F 1/3209 |
| 2021/0266827 A1* | 8/2021 | Frenger | H04L 12/12 |
| 2022/0039009 A1* | 2/2022 | Iyer | H04L 5/0098 |
| 2022/0046533 A1* | 2/2022 | Frenger | H04W 52/0206 |
| 2022/0264628 A1* | 8/2022 | Xue | H04W 72/23 |
| 2022/0353809 A1* | 11/2022 | Maleki | H04W 76/28 |
| 2023/0024741 A1* | 1/2023 | Luo | H04W 76/34 |
| 2023/0370974 A1* | 11/2023 | Shen | H04L 5/0096 |
| 2024/0381485 A1* | 11/2024 | Freda | H04W 76/28 |
| 2025/0142474 A1* | 5/2025 | Cheng | H04W 52/0235 |

FOREIGN PATENT DOCUMENTS

| | | |
|---|---|---|
| CN | 110557807 A | 12/2019 |
| CN | 110831259 A | 2/2020 |
| CN | 111200661 A | 5/2020 |
| CN | 111417208 A | 7/2020 |
| WO | 2020155166 A1 | 8/2020 |
| WO | 2020164025 A1 | 8/2020 |

OTHER PUBLICATIONS

"Study on User Equipment (UE) power saving in NR", 3GPP TR 38.840 V16.0.0, Jun. 24, 2019, 47 pages.

Qualcomm Incorporated, "UE power saving evaluation methodology", 3GPP tsg_ran\wg1_rl1, R1-1811281, Sep. 2018, 21 pages.

First Office Action issued in related Chinese Application No. 202110199051.1, mailed Nov. 30, 2023, 7 pages.

Sony, "NB-IoT UE Power Consumption Reduction in Idle Mode Paging", 3GPP tsg_ran\WG1_RL1, R1-1705203, Mar. 2017, 4 pages.

* cited by examiner

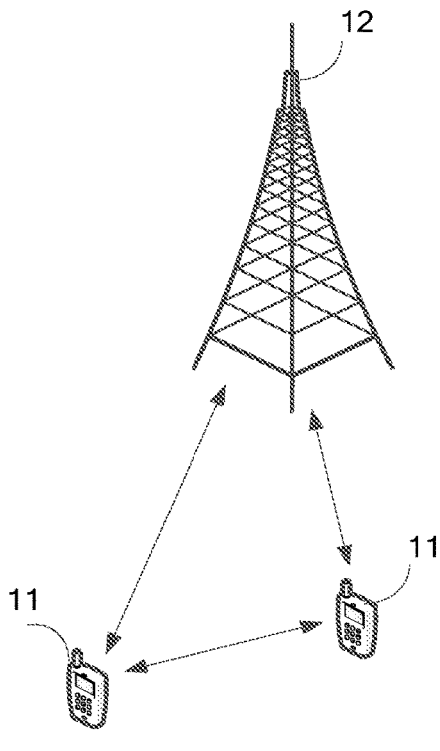
FIG. 1
Perform a first behavior in a case that a terminal is in a first state, where the first behavior is different from a behavior of the terminal is in a connected state, an idle state, or an inactive state                201
FIG. 2
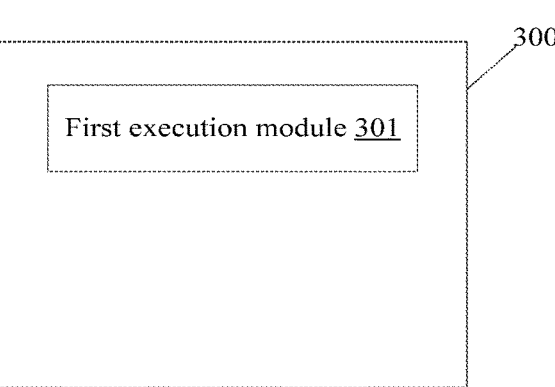
First execution module 301
300
FIG. 3

POWER SAVING METHOD AND APPARATUS, DEVICE, AND READABLE STORAGE MEDIUM

CROSS-REFERENCE TO RELATED APPLICATIONS

This application is a continuation of International Application No. PCT/CN2022/076684, filed Feb. 17, 2022, which claims priority to Chinese Patent Application No. 202110199051.1, filed Feb. 22, 2021. The entire contents of each of the above-referenced applications are expressly incorporated herein by reference.

TECHNICAL FIELD

This application relates to the field of communication technologies, and specifically relates to a power saving method and apparatus, a device, and a readable storage medium.

BACKGROUND

In communication systems of a third-generation (3G) mobile communication technology, a fourth-generation (4G) mobile communication technology, and a fifth-generation (5G) mobile communication technology, different Radio Resource Control (RRC) states of a terminal (for example, user equipment (UE)) are introduced, including an idle (IDLE) state and a connected (CONNECTED) state. During data receiving or sending or a service operation, the UE enters a connected state. After data receiving or sending is completed, the UE may be switched from a connected state to an idle state to save power. In an idle state, the terminal only needs to receive necessary synchronization information, paging information, and a System Information Blocks (SIB), and also needs to perform Radio Resource Management (RRM) measurement for a cell selection/reselection operation. Compared with a connected state, the power can be greatly reduced, and generally can reach dozens of mW, which is one tenth or less of that in a connected state.

However, in systems of a 4G later period and 5G New Radio (NR), a new RRC state: an inactive (INACTIVE) state is introduced. In this state, a behavior of the terminal is basically similar to that in an idle state. In addition to the foregoing behavior in an idle state, a Radio Access Network (RAN) paging message needs to be received and an RAN notification area (RNA) needs to be updated.

It can be learned that, in an idle state or an inactive state, the terminal still needs to periodically open a transceiver and a signal processing module of a corresponding modem to perform corresponding processing on a received signal. However, because these Radio Frequency (RF) and modem modules cannot be completely disabled, communication power consumption in an idle state or an inactive state cannot be reduced.

SUMMARY

Embodiments of this application provide a power saving method and apparatus, a device, and a readable storage medium.

According to a first aspect, a power saving method is provided, performed by a terminal and including:

performing a first behavior in a case that the terminal is in a first state, where the first behavior is different from a behavior of the terminal is in a connected state, an idle state, or an inactive state; and the first state includes one of the following: a sleep state, a zero power state, a near-zero power state, a low power state, or an ultra-low power state.

According to a second aspect, a power saving apparatus is provided, applied to a terminal and including:

a first execution module, configured to perform a first behavior in a case that the terminal is in a first state, where the first behavior is different from a behavior of the terminal is in a connected state, an idle state, or an inactive state; and the first state includes one of the following: a sleep state, a zero power state, a near-zero power state, a low power state, or an ultra-low power state.

According to a third aspect, a terminal is provided, including a processor, a memory, and a program or an instruction that is stored in the memory and that can be run on the processor, where the program is executed by the processor to implement the steps of the method in the first aspect.

According to a fourth aspect, a readable storage medium is provided. The readable storage medium stores a program or an instruction, and the program or the instruction is executed by a processor to implement the steps of the method in the first aspect.

According to a fifth aspect, a computer program product is provided. The computer program product is stored in a non-volatile storage medium, and the program product is executed by at least one processor to implement the steps of the method in the first aspect.

According to a sixth aspect, a chip is provided. The chip includes a processor and a communication interface, the communication interface is coupled to the processor, and the processor is configured to run a program or an instruction to implement the method in the first aspect.

In the embodiments of this application, a terminal may further reduce a receiving, monitoring, or measurement behavior in a first state (for example, reduce receiving of synchronization information, paging information, and an SIB, and reduce RRM measurement). Through reducing of the receiving, monitoring, or measurement behavior, real disabling of a receiver or a receiving module in the first state can be achieved, thereby greatly reducing power consumption of the terminal and achieving a power saving effect.

BRIEF DESCRIPTION OF DRAWINGS

FIG. 1 is a schematic diagram of a wireless communication system to which embodiments of this application can be applied;

FIG. 2 is a flowchart of a power saving method according to an embodiment of this application;

FIG. 3 is a schematic diagram of a power saving apparatus according to an embodiment of this application.

DETAILED DESCRIPTION

Figure 4:
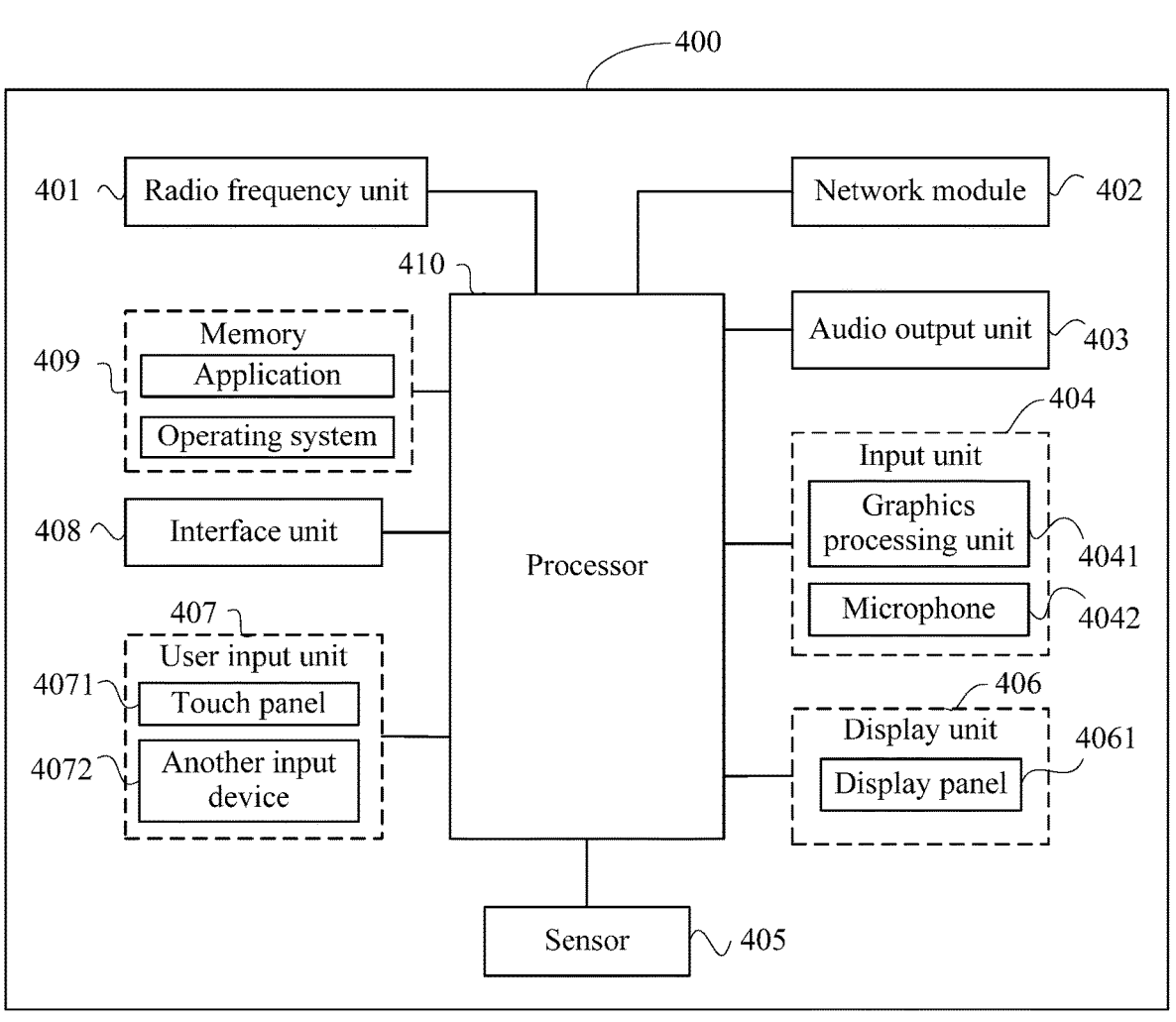
FIG. 4 is a schematic diagram of a terminal according to an embodiment of this application.

To better understand the embodiments of this application, the following technical points are first described below:

I. RRC State

A terminal and a network communicate with each other through a radio channel, and exchange a large amount of information with each other. Therefore, both parties need a control mechanism to exchange configuration information and reach an agreement. This control mechanism is RRC, that is, radio resource control. To enable the terminal to maintain a relatively fixed communication state, different RRC states are introduced in 4G and 5G communication systems. For example:

There are three RRC states in 5G NR: an idle state, an inactive state, and a connected state.

There are only two RRC states in 4G Long Term Evolution (LTE): a radio resource control idle (RRC_IDLE) state and a radio resource control connected (RRC_CONNECTED) state. A new state: a radio resource control inactive (RRC_INACTIVE) state is introduced in 5G NR.

Features of the three states are as follows:

(1) RRC_IDLE state:
  (a) selection of a Public Land Mobile Network (PLMN);
  (b) broadcast system information;
  (c) cell reselection mobility;
  (d) paging of mobile terminated data is initiated by a 5G core network (5G Core, 5GC);
  (e) paging in a mobile terminated data area is managed by the 5GC; and
  (f) Discontinuous Reception (DRX) configured by a Non-Access Stratum (NAS) for Core Network (CN) paging.

(2) RRC_INACTIVE state:
  (a) selection of a PLMN;
  (b) broadcast system information;
  (c) cell reselection mobility;
  (f) paging is initiated by a 5G access network (NG-RAN) (RAN paging);
  (e) an RAN-based notification area (RNA) is managed by the NG-RAN;
  (f) DRX configured by the NG-RAN for RAN paging;
  (g) establishment of a 5GC-NG-RAN connection (including a control plane/a user plane) for UE;
  (h) an Access Stratum (AS) packet of the UE is stored in the NG-RAN and the UE; and
  (i) the NG-RAN knows an RNA to which the UE belongs.

(3) RRC_CONNECTED state:
  (a) establishment of a 5GC-NG-RAN connection (including a control plane/a user plane) for UE;
  (b) an AS packet of the UE is stored in an NG-RAN and the UE;
  (c) the NG-RAN knows a cell to which the UE belongs;
  (d) transmission of unicast data to or from the UE; and
  (e) network control mobility, including measurement.

II. Core Network State

Connection management (CM) consists of establishment and release of a NAS signaling connection between UE and an Access and Mobility Management Function (AMF). The NAS signaling connection is used to exchange NAS signaling between the UE and a core network, and includes two parts:

(1) a signaling connection between the UE and an Access Network (AN) (an RRC connection in a 3rd Generation Partnership Project (3GPP) access mode, and a UE-non-3GPP inter working function (Non-3GPP Inter Working Function, N3IWF) connection in a non-3rd Generation Partnership Project (non-3GPP) mode); and (2) an N2 connection between the AN and the AMF.

1. Connection Management State (CM State) in a 5G System (5GS)

There are two states of the signaling connection between the UE and the AMF in the 5GS:

a connection management idle (CM-IDLE) state; and a connection management connected (CM-CONNECTED) state.

The CM state is independent for 3GPP access and non-3GPP access, that is, an idle state in one of 3GPP access or non-3GPP access and a connected state in the other.

1.1 CM-IDLE State

When the UE is in a CM-IDLE state, there is no N2 or N3 connection of the terminal.

When the UE is in a CM-IDLE state and a connection management registered (RM-REGISTERED) state (that is, the UE is registered but has no NAS signaling connection), the UE should:

initiate a service-request (service-request) procedure in response to paging of a network, unless the UE is in a Mobile Initiated Connection Only (MICO) mode; and initiate a service-request procedure if the UE needs to send uplink signaling or data.

When the signaling connection between the UE and the AN is established (the RRC connection in the 3GPP access mode and the UE-N3IWF connection in the non-3GPP mode), the UE enters a CM-CONNECTED state. Transmission of an initial NAS message triggers a state transition procedure of the UE from CM-IDLE to CM-CONNECTED.

When the UE is in a CM-idle state and an RM-registered state (that is, the UE is registered but has no NAS signaling connection), the AMF should:

send paging to the UE when the AMF has signaling or terminating data to be sent to the UE.

When an N2 connection is established, the AMF enters a CM-CONNECTED state. Upon receiving the initial NAS message, the AMF is triggered to perform the state transition procedure from CM-IDLE to CM-CONNECTED.

1.2 CM-CONNECTED State

An NAS signaling connection is established between the UE in a CM-CONNECTED state and the corresponding AMF. When the UE is in a CM-CONNECTED state, the UE should:

enter a CM-IDLE state when a signaling connection of the AN is received (that is, the RRC connection is released (3GPP access) or the UE-N3IWF connection is released (non-3GPP access)).

When the UE is in a CM-CONNECTED state, the AMF should:

enter a CM-IDLE state when a next-generation application protocol (NGAP) signaling connection and an N3 user plane connection are released.

When the UE in a CM-CONNECTED state enters an RRC_INACTIVE state:

reachability of the UE is managed by the access network;

paging of the UE is managed by the access network; and the UE needs to monitor paging of a core network ID (for example, 5GS-temporary mobile subscription identifier (5GS-TMSI)) and paging of an RAN-ID at the same time.

III. Wake-Up Signal (WUS)

In LTE and NR systems, to save power, a wake-up signal is introduced in a connected state and an idle/inactive state, so that in a case that connected state DRX or idle state DRX is configured, the terminal may monitor a Physical Downlink Control Channel (PDCCH) from a sleep state (that is, a DRX off state) (that is, enter a DRX on state) as required.

In some embodiments, in a connected state, the terminal monitors, on a corresponding monitor occasion, a Downlink Control Information (DCI) signal that is sent by a network side and on which Cyclic Redundancy Check (CRC) scrambling is performed by using a Power Saving Radio Network Temporary Identifier (PS-RNTI) (DCI with CRC scrambled by PS-RNTI, DCP), to determine whether to return to an active state from a DRX off state, so as to monitor the PDCCH and complete corresponding connected state scheduling and data transmission. In an idle/inactive state, the terminal monitors, in each DRX cycle, a WUS or a Permanent Equipment Identifier (PEI) message sent by a network side on a corresponding monitor occasion, to determine whether a PDCCH and/or a Physical Downlink Shared Channel (PDSCH) message corresponding to a paging message in one or more subsequent DRX cycles needs to be monitored.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a new radio (NR) system for example purposes, and NR terms are used in most of the following descriptions, although these technologies can also be applied to an application other than an NR system application, for example, a 6th generation (6G) communications system.

FIG. 1 is a block diagram of a wireless communication system to which embodiments of this application can be applied. The wireless communications system includes a terminal 11 and a network side device 12. The terminal 11 may also be referred to as a terminal device or UE. The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile interne device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station or a core network device. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (Wi-Fi) node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, a power saving method and apparatus, a device, and a readable storage medium provided in the embodiments of this application are described in detail by using some embodiments and application scenes.

Referring to FIG. 2, an embodiment of this application provides a power saving method. The method may be performed by a terminal. Specific steps include step 201.

Step 201: Perform a first behavior in a case that the terminal is in a first state, where the first behavior is different from a behavior of the terminal is in a connected state, an idle state, or an inactive state.

The first state includes one of the following: a sleep state, a zero power state, a near-zero power (Almost Zero Power (AZP) or Near Zero Power (NZP)) state, a low power (LP) state, and an ultra-low power (ULP) or Super Low Power (SLP) state.

It should be noted that a receiving, monitoring, or measurement behavior of the terminal in the first state is less than a receiving, monitoring, or measurement behavior of the terminal is in a connected state, an idle state, or an inactive state.

The first state is a newly defined terminal state, and may be a newly defined RRC state, that is, an RRC state other than three existing RRC states: an RRC connected state (RRC_CONNECTED), an RRC idle state (RRC_IDLE), and an RRC inactive state (RRC_INACTIVE); or a sub-state of an existing RRC state, for example, a sub-state of an RRC idle state; or a newly defined core network state, that is, a core network state other than an existing core network connected state (for example, connection management CM_CONNECTED) and a core network idle state (CM_IDLE).

Power consumption of the terminal in the first state is lower than power consumption of the terminal in a connected state, an idle state, or an inactive state. In some embodiments, the power consumption includes power consumption per unit time, power consumption of a same time length, or a power value.

In an implementation of this application, the first behavior includes one or more of the following:

(1) Disabling a Radio Frequency (RF) module. It may be understood that the radio frequency module may also be referred to as a radio frequency unit, for example, the radio frequency unit includes but is not limited to an antenna, at least one amplifier, a transceiver, a coupler, a low-noise amplifier, and a duplexer.

(2) Disabling a Base Band (BB) module;

(3) Disabling a function module corresponding to a modem.

It can be understood that the modem may also be referred to as a modem processor that mainly processes wireless communication, such as a baseband processor. If the modem is integrated into a processor, the first behavior includes disabling a function module corresponding to the modem in the processor.

(4) Not performing synchronization.

(5) Not receiving a reference signal.

For example, a Synchronization Signal and PBCH block (SSB), a tracking reference signal (TRS), a Channel State Information Reference Signal (CSI_RS), or a demodulation reference signal (DMRS) is not received.

(6) Not monitoring a PDCCH.

(7) Not receiving a paging message.

(8) Not receiving a short message.

(9) Not receiving system information.

(10) Not performing Radio resource management (RRM) measurement.

(11) Not receiving a system information update indication.

(12) Not receiving a Public warning system (PWS) message.

For example, an Earthquake and Tsunami Warning System (ETWS) message or a Commercial Mobile Alert System (CMAS) message is not received.

(13) Not selecting a public land mobile network (PLMN).

(14) Not performing cell selection or reselection.

(15) Not performing (or not requiring to perform) core network registration (Regist) or camping (Camp) or attaching (Attach).

In an implementation of this application, a behavior that is not performed (or does not need to be performed) by the terminal in the first behavior is implemented through one or more of the following:

(1) A corresponding requirement (requirements) is not defined.

(2) The terminal does not meet (or does not need to meet) a requirement corresponding to an idle state, an inactive state, or a connected state in the first state.

(3) A protocol stipulation, that is, a specific behavior that the terminal does not need to perform in the first state is written in the protocol.

(4) The terminal implements self-determination.

That a corresponding requirement is not defined means that a corresponding behavior requirement of the terminal in the first state is not defined in the protocol.

The terminal in the first state does not need to meet a requirement corresponding to an idle state, an inactive state, or a connected state, where the requirement corresponding to the idle state, the inactive state, or the connected state is a corresponding behavior requirement of the terminal in the idle state, the inactive state, or the connected state that is defined in the protocol.

In an implementation of this application, the method may further include: performing a second behavior in a case that the terminal enters the first state through determining (for example, determining that the terminal needs to or may enter the first state) or a network side configuration (for example, configuring that the terminal needs to or may enter the first state); and the second behavior includes one or more of the following:

(1) A radio resource control connection release (RRC_RELEASE) procedure.

(2) A detach procedure.

(3) Stopping, restarting, suspending, or continuing a first timer or a first counter, where the first timer is a timer corresponding to an idle state, an inactive state, or a connected state, and the first counter is a counter corresponding to an idle state, an inactive state, or a connected state.

For example, a counter or a timer (N310, N311, T310) corresponding to radio link monitoring (RLM)/beam failure detection (BFD) in an RRC_CONNECTED state, or a timer or a counter (T311, T312, or the like) in an RRC connection setup process. A corresponding timer or counter is determined through mobility in an RRC_IDLE/INACTIVE state.

(4) Releasing some or all configurations of a second state, where the second state is an idle state, an inactive state, or a connected state before the first state.

That is, some or all configurations in an idle state, an inactive state, or a connected state before the first state are not saved.

In some embodiments, the configuration may include an RRC configuration, a system message, a core network or NAS configuration, or the like.

In some embodiments, the idle state may include RRC_IDLE or CM_IDLE, and the connected state may include RRC_CONNECTED or CM_CONNECTED.

For example:

(a) When the terminal enters the first state (for example, RRC_SLEEP) from an RRC_CONNEDCTED state, some or all RRC configurations are released.

(b) When the terminal enters the first state (for example, RRC_SLEEP) from an RRC_INACTIVE state, some or all RRC configuration and some or all system messages are released.

(c) When the terminal enters the first state (for example, RRC_SLEEP) from an RRC_IDLE state, some or all RRC configurations that continue to take effect in IDLE and some or all system messages are released.

(d) Further, when the terminal enters the first state (for example, RRC_SLEEP) from an RRC_IDLE, RRC_INACTIVE, or RRC_CONNECTED state, some or all NAS-related configurations are released, including one or more of the following: registration information, DRX configuration information, and tracking area (TA) related configurations.

(5) A procedure of entering the first state (for example, RRC_SLEEP) from an idle state, an inactive state, or a connected state.

The procedure may include: the terminal enters the first state through determining or the network side configuration according to a preset condition, and then enters the first state from an idle state, an inactive state, or a connected state. The preset condition is stipulated in the protocol or is configured by a network.

In an implementation of this application, the first behavior may further include one or more of the following:

(1) Enabling a receiver or a receiving module corresponding to the first state.

It can be understood that the receiver or the receiving module corresponding to the first state is an extra-introduced receiver or receiving module. For example, the receiver includes a near-zero power receiver, a zero power receiver, an ultra-low power receiver, a low power receiver, or a power saving mode receiver. The receiving module includes a near-zero power receiving module, a zero power receiving module, an ultra-low power receiving module, a low power receiving module, or a power saving mode receiving module.

For example, the near-zero power receiver does not need signal detection (for example, amplification, filtering, and quantization) of a complex radio frequency module (or referred to as a radio frequency unit) and modulation or demodulation signal processing, and the terminal can be awakened through only passive matching filtering and signal processing of relatively small power consumption.

(2) Receiving a Wake-Up Signal (WUS) or an activation signal (Power-on Signaling (POS)) at a preset resource location.

On the terminal side, a wake-up signal or an activation signal sent by the network side may activate a newly introduced receiver or receiving module, to learn a wake-up/activation notification, that is, receive the wake-up signal or the activation signal by using the foregoing additionally introduced receiver or receiving module.

In some embodiments, the resource location may include one or more of the following: a time domain resource location, a frequency domain resource location, a space domain resource location, a code domain resource location, and a beam resource location.

In some embodiments, the preset resource location is configured by the network side. For example, the preset resource location is configured by the network side before the terminal enters the first state.

In an implementation of this application, the wake-up signal or the activation signal received at the preset resource location is different from a wake-up signal or an activation signal received by the terminal in a connected state, an idle state, or an inactive state. In some embodiments, the preset resource location is specified in a protocol or configured by a network side.

The details are as follows:

(i) Different receivers: In an RRC_CONNECTED state, a corresponding PDCCH is received by using a modem module. In an RRC_IDLE/INACTIVE state, a corresponding PDCCH and/or sequence are/is received by using a modem module. In the first state (RRC_SLEEP) state, a corresponding sequence is received by using a newly introduced receiver.

(ii) Different functions: In an RRC_CONNECTED state, the UE continues to monitor a PDCCH after waking up from a DRX_OFF state. In an RRC_IDLE/INACTIVE state, the UE continues to monitor a PDCCH and/or a paging message (or a short message) after waking up from a DRX_OFF state. In the first state (RRC_SLEEP), the UE enters an idle/inactive/connected state after waking up from the first state (RRC_SLEEP).

In an implementation of this application, the wake-up signal or the activation signal includes an on-off keying signal. In this way, the receiver or the receiving module may learn the wake-up signal or the activation signal through a process such as simple energy detection and subsequent possible sequence detection and identification.

In an implementation of this application, the wake-up signal or the activation signal is sent by the network side as required (on-demand), that is, when the terminal needs to exit from the first state, or enter an idle state, an inactive state, or a connected state, the wake-up signal or the activation signal is sent to the terminal.

(3) Monitoring a first signal, where the first signal is used to indicate area information, and in some embodiments, the area includes one or more of the following: a cell, a radio access network notification area (RNA), a tracking area, and a new area for the first state (a newly defined new area for the first state (for example, RRC_SLEEP)).

In an implementation of this application, the first signal includes a sequence specified in a protocol or configured by a network side, and the sequence is used to indicate information about an area in which the terminal is located.

In some embodiments, a correspondence between the sequence and the area information is specified in the protocol or configured by the network side.

In some embodiments, that the first signal is used to indicate area information means that the first signal is applied to an area corresponding to the first state or the first signal corresponds to an area corresponding to the first state, which may include at least one of the following:

a. one or more cells (cell);

b. one or more RNAs; or c. One or more TAs.

(4) Updating an area.

In some embodiments, the area includes one or more of the following: a cell, an RNA, a tracking area, a new area for the first state (a newly defined new area for the first state (for example, RRC_SLEEP)).

In some embodiments, the updating an area includes one of the following:

(i) when the terminal determines that an area in which the terminal is located changes, entering an idle state, an inactive state, or a connected state before the first state, and then updating the area;

(ii) when the terminal determines that an area in which the terminal is located changes, entering an idle state, an inactive state, or a connected state, and then updating the area; and (iii) updating an area in the first state.

Where:

(a) When the area is a cell, that is, the terminal needs to perform area updating when a cell is changed once.

(b) When the area is an RNA, that is, the terminal needs to perform area updating when an RNA is changed once (a specific update procedure may reuse a procedure in an inactive state, or is updated after returning from an RRC_SLEEP state to an idle/inactive state).

(c) When the area is a TA, that is, the terminal needs to perform area updating when a TA is changed once (a specific update procedure may reuse a procedure in an idle state, or is updated after returning from the first state (for example, RRC_SLEEP) to an idle state).

(d) When the area is newly defined for the first state (for example, RRC_SLEEP), the terminal needs to perform area updating when a new area is changed once.

(5) Receiving a system information (SI) change indication, where the system information change indication is used to receive a notification by using the wake-up signal or the activation signal in the first state.

For example, after receiving the SI change indication, the terminal returns to an idle state, and then receives updated SI.

For another example, after receiving the SI change indication, the terminal returns to an idle state, synchronously receives an SSB, and then receives latest SI.

(6) Enabling a second timer, and if the second timer expires, entering an idle state, an inactive state, or a connected state before the first state, or entering an idle state, an inactive state, or a connected state; or if the second timer expires, determining whether an area is updated or directly updating an area.

In an implementation of this application, the receiver or the receiving module corresponding to the first state has one or more of the following features:

(1) Specific radio frequency signal detection and/or modulation or demodulation signal processing are/is not performed.

In some embodiments, the specific radio frequency signal detection is complex radio frequency signal detection, including but not limited to amplification, filtering, and quantization.

(2) Passive matching filtering processing and/or first signal processing are/is performed, where power consumption of processing the first signal is less than signal processing power consumption in a third state, and the third state is an idle state, an inactive state, or a connected state before the first state.

In this embodiment of this application, the receiver or the receiving module corresponding to the first state does not need to perform complex RF signal detection (for example, amplification, filtering, and quantization) and signal processing of a modem, and the terminal can be waken up or activated only through passive matching filtering and signal processing with less power consumption.

(3) When the terminal is in an idle state, an inactive state, or a connected state, the receiver or the receiving module corresponding to the first state is disabled or started.

In an implementation of this application, the method further includes: performing a third behavior if the wake-up signal or the activation signal is received, where the third behavior includes one or more of the following:

(1) Triggering the terminal to execute a preset hardware procedure.

For example, the receiver or the receiving module is enabled. For example, a radio frequency module or a baseband module is enabled.

(2) Entering an idle state, an inactive state, or a connected state before the first state.

(3) Entering an idle state, an inactive state, or a connected state.

In an implementation of this application, the method further includes:

performing a fourth behavior in a case that the terminal exits the first state through determining (for example, determining that the terminal needs to or may exit the first state) or a network configuration (for example, configuring that the terminal needs to or may exit the first state), where the fourth behavior includes one or more of the following:

(1) Triggering the terminal to execute a preset hardware procedure.

For example, the receiver or the receiving module is enabled. For example, a radio frequency module or a baseband module is enabled.

(2) Entering an idle state, an inactive state, or a connected state before the first state.

(3) Entering an idle state, an inactive state, or a connected state.

In some embodiments, further, after returning to an idle state, an inactive state, or a connected state, at least one of the following continues to be performed:

(i) Receiving an SSB, and synchronously receiving SI or a paging message.

(ii) Directly receiving a paging message.

In this embodiment of this application, a terminal may further reduce a receiving, monitoring, or measurement behavior in a first state (for example, reduce receiving of synchronization information, paging information, and an SIB, and reduce RRM measurement). Through reducing of the receiving/monitoring behavior, real disabling of a receiver or a receiving module in the first state can be achieved, thereby greatly reducing power consumption of the terminal and achieving a power saving effect.

Referring to FIG. 3, an embodiment of this application provides a power saving apparatus, applied to a terminal. The apparatus 300 includes:

a first execution module 301, configured to perform a first behavior in a case that the terminal is in a first state, where the first behavior is different from a behavior of the terminal is in a connected state, an idle state, or an inactive state; and the first state includes one of the following: a sleep state, a zero power state, a near-zero power state, a low power state, or an ultra-low power state.

In an implementation of this application, the first behavior includes one or more of the following:

(1) Disabling a radio frequency module.

It can be understood that the radio frequency module may also be referred to as a radio frequency unit, for example, the radio frequency unit includes but is not limited to an antenna, at least one amplifier, a transceiver, a coupler, a low-noise amplifier, and a duplexer.

(2) Disabling a baseband module.

(3) Disabling a function module corresponding to a modem.

It can be understood that the modem may also be referred to as a modem processor that mainly processes wireless communication, such as a baseband processor. If the modem is integrated into a processor, the first behavior includes disabling a function module corresponding to the modem in the processor.

(4) Not performing synchronization.

(5) Not receiving a reference signal.

(6) Not monitoring a physical downlink control channel.

(7) Not receiving a paging message.

(8) Not receiving a short message.

(9) Not receiving system information.

(10) Not performing radio resource management measurement.

(11) Not receiving a system information update indication.

(12) Not receiving a public warning system message.

(13) Not selecting a public land mobile network.

(14) Not performing cell selection or reselection.

(15) Not performing (or not requiring to perform) core network registration or camping or attaching.

In an implementation of this application, a behavior that is not performed (or does not need to be performed) by the terminal in the first behavior is implemented through one or more of the following:

(1) A corresponding requirement is not defined.

(2) The terminal does not meet (or does not need to meet) a requirement corresponding to an idle state, an inactive state, or a connected state in the first state.

(3) A protocol stipulation.

(4) The terminal implements self-determination.

In an implementation of this application, the apparatus 300 further includes:

a second execution module, configured to perform a second behavior in a case that the terminal enters the first state through determining or a network side configuration, where the second behavior includes one or more of the following:

(1) A radio resource control connection release procedure.

(2) A detach procedure.

(3) Stopping, restarting, suspending, or continuing a first timer or a first counter, where the first timer is a timer corresponding to an idle state, an inactive state, or a connected state, and the first counter is a counter corresponding to an idle state, an inactive state, or a connected state.

(4) Releasing some or all configurations of a second state, where the second state is an idle state, an inactive state, or a connected state before the first state.

(5) A procedure of entering the first state from an idle state, an inactive state, or a connected state.

In an implementation of this application, the first behavior further includes one or more of the following:

(1) Enabling a receiver or a receiving module corresponding to the first state.

It can be understood that the receiver or the receiving module corresponding to the first state is an extra-introduced receiver or receiving module. For example, the receiver includes a near-zero power receiver, a zero power receiver, an ultra-low power receiver, a low power receiver, or a power saving mode receiver. The receiving module includes a near-zero power receiving module, a zero power receiving module, an ultra-low power receiving module, a low power receiving module, or a power saving mode receiving module.

For example, the near-zero power receiver does not need signal detection (for example, amplification, filtering, and quantization) of a complex radio frequency module (or referred to as a radio frequency unit) and modulation or demodulation signal processing, and the terminal can be awakened through only passive matching filtering and signal processing of relatively small power consumption.

(2) Receiving a wake-up signal or an activation signal at a preset resource location.

(3) Monitoring a first signal, where the first signal is used to indicate area information, and an area includes one or more of the following: a cell, a radio access network notification area, a tracking area, and a new area for the first state.

(4) Updating an area.

(5) Receiving a system information change indication, where the system information change indication is used to receive a notification by using the wake-up signal or the activation signal in the first state.

(6) Enabling a second timer, and if the second timer expires, entering an idle state, an inactive state, or a connected state before the first state, or entering an idle state, an inactive state, or a connected state; or if the second timer expires, determining whether an area is updated or directly updating an area.

In an implementation of this application, the receiver or the receiving module corresponding to the first state has one or more of the following features:

(1) Specific radio frequency signal detection and/or modulation or demodulation signal processing are/is not performed.

(2) Passive matching filtering processing and/or first signal processing are/is performed, where power consumption of processing the first signal is less than signal processing power consumption in a third state, and the third state is an idle state, an inactive state, or a connected state before the first state.

(3) When the terminal is in an idle state, an inactive state, or a connected state, the receiver or the receiving module corresponding to the first state is disabled or started.

In an implementation of this application, the wake-up signal or the activation signal received at the preset resource location is different from a wake-up signal or an activation signal received by the terminal in a connected state, an idle state, or an inactive state; and the preset resource location is specified in a protocol or configured by a network side.

In an implementation of this application, the wake-up signal or the activation signal includes an on-off keying signal.

In an implementation of this application, the wake-up signal or the activation signal is sent by a network side as required.

In an implementation of this application, the first signal includes a sequence specified in a protocol or configured by a network side, and the sequence is used to indicate information about an area in which the terminal is located.

In an implementation of this application, a correspondence between the sequence and the area information is specified in the protocol or configured by the network side.

In an implementation of this application, the updating an area includes:

when the terminal determines that an area in which the terminal is located changes, entering an idle state, an inactive state, or a connected state before the first state, and then updating the area;

or when the terminal determines that an area in which the terminal is located changes, entering an idle state, an inactive state, or a connected state, and then updating the area;

or updating an area in the first state.

In an implementation of this application, the apparatus 300 further includes:

a third execution module, configured to perform a third behavior if the wake-up signal or the activation signal is received, where the third behavior includes one or more of the following:

(1) Triggering the terminal to execute a preset hardware procedure.

(2) Entering an idle state, an inactive state, or a connected state before the first state.

(3) Entering an idle state, an inactive state, or a connected state.

In an implementation of this application, the apparatus 300 further includes:

a fourth execution module, configured to perform a fourth behavior in a case that the terminal exits the first state through determining or a network configuration, where the fourth behavior includes one or more of the following:

(1) Triggering the terminal to execute a preset hardware procedure.

For example, the terminal is triggered to enable a radio frequency module (or referred to as a radio frequency unit).

(2) Entering an idle state, an inactive state, or a connected state before the first state.

(3) Entering an idle state, an inactive state, or a connected state.

The apparatus provided in this embodiment of this application can implement the processes implemented in the method embodiment shown in FIG. 2 and achieve a same technical effect. To avoid repetition, details are not described herein again.

FIG. 4 is a schematic diagram of a hardware structure of a terminal for implementing embodiments of this application. The terminal 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the terminal 400 may further include a power supply (such as a battery) that supplies power to each component. The power supply may be logically connected to the processor 410 by using a power supply management system, to implement functions such as charging and discharging management, and power consumption management by using the power supply management system. The terminal structure shown in FIG. 4 constitutes no limitation on the terminal, and the terminal may include more or fewer components than those shown in the figure, or combine some components, or have different component arrangements. Details are not described herein.

It should be understood that, in this embodiment of this application, the input unit 404 may include a Graphics Processing Unit (GPU) 4041 and a microphone 4042, and the graphics processing unit 4041 processes image data of a still picture or a video obtained by an image capture apparatus (such as a camera) in a video capture mode or an image capture mode. The display unit 406 may include a display panel 4061, and the display panel 4061 may be configured in a form of a liquid crystal display, an organic light-emitting diode, or the like. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein.

In this embodiment of this application, the radio frequency unit 401 receives downlink data from a network side device and then sends the downlink data to the processor 410 for processing; and sends uplink data to the network side device. Usually, the radio frequency unit 401 includes but is not limited to an antenna, at least one amplifier, a transceiver, a coupler, a low noise amplifier, a duplexer, and the like.

The memory 409 may be configured to store a software program or an instruction and various data. The memory 409 may mainly include a program or instruction storage area and a data storage area. The program or instruction storage area may store an operating system, and an application or an instruction required by at least one function (for example, a sound playing function or an image playing function). In addition, the memory 409 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 410 may include one or more processing units. In some embodiments, an application processor and a modem processor may be integrated into the processor 410. The application processor mainly processes an operating system, a user interface, an application, an instruction, or the like. The modem processor mainly processes wireless communication, for example, a baseband processor. It can be understood that, the modem processor may not be integrated into the processor 410.

The terminal provided in this embodiment of this application can implement the processes implemented in the method embodiment shown in FIG. 2, and achieve a same technical effect. To avoid repetition, details are not provided herein again.

An embodiment of this application further provides a computer program product, where the computer program product is stored in a non-volatile storage medium, and the computer program product is executed by at least one processor to implement the processing method described in FIG. 2.

An embodiment of this application further provides a readable storage medium. The readable storage medium may be non-transient. The readable storage medium stores a program or an instruction. When the program or the instruction is executed by a processor, processes in the method embodiment shown in FIG. 2 are implemented, and a same technical effect can be achieved. To avoid repetition, details are not described herein again.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction of a network side device to implement the processes of the method embodiments shown in FIG. 2, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include", "comprise", or any other variant is intended to cover a non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above in conjunction with the accompanying drawings, but this application is not limited to the above specific implementations, and the above specific implementations are only illustrative and not restrictive. Enlightened by this application, a person of ordinary skill in the art can make many forms without departing from the purpose of this application and the protection scope of the claims, all of which shall fall within the protection of this application.

The invention claimed is:

1. A power saving method, performed by a terminal, comprising:

performing a first behavior when the terminal is in a first state, wherein the first behavior is different from a behavior of the terminal in a connected state, an idle state, or an inactive state;

a receiver or a receiving module corresponding to the first state receives an activation signal at a preset resource location, wherein the receiver or the receiving module corresponding to the first state is different from a receiver or a receiving module corresponding to the connected state, the idle state, or the inactive state; and the first state comprises one of the following: a zero power state or a near-zero power state.

2. The power saving method according to claim 1, wherein the first behavior comprises one or more of the following:

disabling a radio frequency module;

disabling a baseband module;

disabling a function module corresponding to a modem;

not performing synchronization;

not receiving a reference signal;

not monitoring a physical downlink control channel;

not receiving a paging message;

not receiving a short message;

not receiving system information;

not performing radio resource management measurement;

not receiving a system information update indication;

not receiving a public warning system message;

not selecting a public land mobile network;

not performing cell selection or reselection; or not performing core network registration or camping or attaching.

3. The power saving method according to claim 1, wherein a behavior that is not performed by the terminal in the first behavior is implemented through one or more of the following:

a corresponding requirement is not defined;

the terminal does not meet a requirement corresponding to an idle state, an inactive state, or a connected state in the first state;

a protocol stipulation; or the terminal implements self-determination.

4. The power saving method according to claim 1, further comprising:

performing a second behavior when the terminal determines entering the first state or a network side configures entering the first state, wherein the second behavior comprises one or more of the following:

a radio resource control connection release procedure;

a detach procedure;

stopping, restarting, suspending, or continuing a first timer or a first counter, wherein the first timer is a timer corresponding to the idle state, the inactive state, or the connected state, and the first counter is a counter corresponding to the idle state, the inactive state, or the connected state;

releasing some or all configurations of a second state, wherein the second state is an idle state, an inactive state, or a connected state before the first state; or a procedure of entering the first state from the idle state, the inactive state, or the connected state.

5. The power saving method according to claim 1, wherein the first behavior further comprises one or more of the following:

enabling the receiver or the receiving module corresponding to the first state;

receiving the activation signal at the preset resource location;

monitoring a first signal, wherein the first signal is used to indicate area information, and an area comprises one or more of the following: a cell, a radio access network notification area, a tracking area, or an area for the first state;

updating an area;

receiving a system information change indication, wherein the system information change indication is used to receive a notification by using the activation signal in the first state; or enabling a second timer, and when the second timer expires, entering an idle state, an inactive state, or a connected state before the first state, or entering the idle state, the inactive state, or the connected state; or when the second timer expires, determining whether an area is updated or directly updating an area.

6. The power saving method according to claim 5, wherein the receiver or the receiving module corresponding to the first state has one or more of the following features:

specific radio frequency signal detection or modulation/demodulation signal processing is not performed;

passive matching filtering processing or first signal processing is performed, wherein power consumption of processing the first signal is less than signal processing power consumption in a third state, and the third state is an idle state, an inactive state, or a connected state before the first state; or when the terminal is in an idle state, an inactive state, or a connected state, the receiver or the receiving module corresponding to the first state is disabled or started.

7. The power saving method according to claim 5, wherein the activation signal received at the preset resource location is different from an activation signal received by the terminal in a connected state, an idle state, or an inactive state; and the preset resource location is specified in a protocol or configured by a network side.

8. The power saving method according to claim 5, wherein the activation signal comprises an on-off keying signal.

9. The power saving method according to claim 5, wherein the first signal comprises a sequence specified in a protocol or configured by a network side, and the sequence is used to indicate information about an area in which the terminal is located.

10. The power saving method according to claim 9, wherein a correspondence between the sequence and the area information is specified in the protocol or configured by the network side.

11. The power saving method according to claim 5, wherein the updating an area comprises:

when the terminal determines that an area in which the terminal is located changes, entering the idle state, the inactive state, or the connected state before the first state, and then updating the area;

or when the terminal determines that an area in which the terminal is located changes, entering the idle state, the inactive state, or the connected state, and then updating the area;

or updating an area in the first state.

12. The power saving method according to claim 5, further comprising:

performing a third behavior when the activation signal is received, wherein the third behavior comprises one or more of the following:

triggering the terminal to execute a preset hardware procedure;

entering the idle state, the inactive state, or the connected state before the first state; or entering the idle state, the inactive state, or the connected state.

13. The power saving method according to claim 1, further comprising:

performing a fourth behavior when the terminal exits the first state through determining or a network configuration, wherein the fourth behavior comprises one or more of the following:

triggering the terminal to execute a preset hardware procedure;

entering an idle state, an inactive state, or a connected state before the first state; or entering the idle state, the inactive state, or the connected state.

14. A terminal, comprising:

a memory storing a computer program; and a processor coupled to the memory and configured to execute the computer program to perform a first behavior when the terminal is in a first state, wherein the first behavior is different from a behavior of the terminal in a connected state, an idle state, or an inactive state;

a receiver or a receiving module corresponding to the first state receives an activation signal at a preset resource location, wherein the receiver or the receiving module corresponding to the first state is different from a receiver or a receiving module corresponding to the connected state, the idle state, or the inactive state; and the first state comprises one of the following: a zero power state or a near-zero power state.

15. The terminal according to claim 14, wherein the first behavior comprises one or more of the following:

disabling a radio frequency module;

disabling a baseband module;

disabling a function module corresponding to a modem;

not performing synchronization;

not receiving a reference signal;

not monitoring a physical downlink control channel;

not receiving a paging message;

not receiving a short message;

not receiving system information;

not performing radio resource management measurement;

not receiving a system information update indication;

not receiving a public warning system message;

not selecting a public land mobile network;

not performing cell selection or reselection; or not performing core network registration or camping or attaching.

16. The terminal according to claim 14, wherein a behavior that is not performed by the terminal in the first behavior is implemented through one or more of the following:

a corresponding requirement is not defined;

the terminal does not meet a requirement corresponding to an idle state, an inactive state, or a connected state in the first state;

a protocol stipulation; or the terminal implements self-determination.

17. The terminal according to claim 14, wherein the processor is configured to execute the computer program to further perform a second behavior when the terminal determines entering the first state or a network side configures entering the first state, wherein the second behavior comprises one or more of the following:

a radio resource control connection release procedure;

a detach procedure;

stopping, restarting, suspending, or continuing a first timer or a first counter, wherein the first timer is a timer corresponding to the idle state, the inactive state, or the connected state, and the first counter is a counter corresponding to the idle state, the inactive state, or the connected state;

releasing some or all configurations of a second state, wherein the second state is an idle state, an inactive state, or a connected state before the first state; or a procedure of entering the first state from the idle state, the inactive state, or the connected state.

18. The terminal according to claim 14, wherein the first behavior further comprises one or more of the following:

enabling the receiver or the receiving module corresponding to the first state;

receiving the activation signal at the preset resource location;

monitoring a first signal, wherein the first signal is used to indicate area information, and an area comprises one or more of the following: a cell, a radio access network notification area, a tracking area, or an area for the first state;

updating an area;

receiving a system information change indication, wherein the system information change indication is used to receive a notification by using the activation signal in the first state; or enabling a second timer, and when the second timer expires, entering an idle state, an inactive state, or a connected state before the first state, or entering the idle state, the inactive state, or the connected state; or when the second timer expires, determining whether an area is updated or directly updating an area.

19. The terminal according to claim 18, wherein the receiver or the receiving module corresponding to the first state has one or more of the following features:

specific radio frequency signal detection or modulation/demodulation signal processing is not performed;

passive matching filtering processing or first signal processing is performed, wherein power consumption of processing the first signal is less than signal processing power consumption in a third state, and the third state is an idle state, an inactive state, or a connected state before the first state; or when the terminal is in an idle state, an inactive state, or a connected state, the receiver or the receiving module corresponding to the first state is disabled or started.

20. A non-transitory computer-readable storage medium, storing a computer program, when the computer program is executed by a processor of a terminal, causes the processor to perform a first behavior when the terminal is in a first state, wherein the first behavior is different from a behavior of the terminal in a connected state, an idle state, or an inactive state;

a receiver or a receiving module corresponding to the first state receives an activation signal at a preset resource location, wherein the receiver or the receiving module corresponding to the first state is different from a receiver or a receiving module corresponding to the connected state, the idle state, or the inactive state; and the first state comprises one of the following: a zero power state or a near-zero power state.

* * * * *